United States Patent Office 2,794,002
Patented May 28, 1957

2,794,002

METHOD FOR PRODUCING SOLID SILICEOUS CATALYST

Vladimir Haensel, Hinsdale, and John W. Ziglar, Brookfield, Ill., assignors to Universal Oil Products Company, Des Plaines, Ill., a corporation of Delaware No Drawing. Application December 14, 1953,
Serial No. 398,222

2 Claims. (Cl. 252—441)

This invention relates to the preparation of solid siliceous composites by a unique method which produces siliceous material having desirable characteristics.

In particular, our invention broadly comprises the method of preparing extremely pure low surface area siliceous composites by treating hydrolyzable organic silicon-containing compounds with HF to form a hydrosol which sets to a resultant hydrogel which in turn may be dried and calcined. In particular, our invention relates to the preparation of low surface area silica or silica-containing composites by treating ethylorthosilicate with HF to form a hydrosol which sets to a hydrogel which in turn may be dried and calcined to form the desired low surface area extremely pure siliceous composite.

Although many methods are known for producing silica gel, these methods all have undesirable limitations. The one common method is to acidify a water glass solution, which is a soluble sodium silicate, to thereby form a silica hydrosol which upon standing will become a transparent vibrant hydrogel. A hydrogel is a gelatinous material which contains all of the water in which the original material was dissolved so that the entire volume of solution becomes a semi-solid. When the hydrogel is dried and calcined the water entrapped or contained therein is removed with the resultant shrinkage of volume. A dry, porous solid characterized by having extremely large surface area per unit of volume is thereby formed.

Siliceous composites such as those formed by the present process are useful in many applications, however, the most important of these is their use as catalytic materials or carriers for catalytic materials. The material produced by the present process is particularly useful in this function because of its extreme purity and desirable physical characteristics and dimensions.

In the process of the present invention it has been found that an unexpectedly small amount of HF is required to form a hydrogel from the ethylorthosilicate solution. Based upon stoichiometric calculations, the amount of HF that will gel an ethylorthosilicate solution is as low as 0.005 of the amount theoretically required for complete neutralization. Although the reason for this is not known it is thought that there is a regeneration of the HF that is consumed by a series of reactions so that a single fluorine ion is instrumental in precipitating many molecules of silica. This suspicion is confirmed by the fact that the by-product of the reaction of HF and ethylorthosilicate is ethyl alcohol while, when a similar precipitation is effected with HCl the by-product is ethylene chloride. As will be hereinafter shown, other differences exist between the two processes. By suitably regulating both the concentration of the ethylorthosilicate solution and the quantity of HF, the speed at which gelation occurs may be controlled.

In a specific embodiment of the invention, the low surface area silica is prepared by adding to an ethylorthosilicate solution from about 0.001 to about 0.1 mol of hydrogen fluoride per mol of ethylorthosilicate, permitting the mixture to set to a hydrogel, drying the hydrogel at a temperature of from about 100° F. to about 600° F. and calcining at a temperature of from about 600° F. to about 1500° F.

The method of producing silica or silica-containing material by treating ethylorthosilicate with HF as described hereinbefore has many advantages over ordinary methods of producing silica gel. The present method produces silica which is extremely pure since the only material contained in the reaction mixture that is not a part of the ultimate product is volatile. Therefore, the product produced by the present invention does not have the undesirable alkali ions present that are present in a siliceous material precipitated from water glass. This is extremely important since alkali ions have many undesirable effects upon such a material including the destruction of its catalytic activity, causing the material to glaze when heated to a high temperature, requiring large quantities of water to be used in expensive washing processes to remove the bound alkali ion to a tolerable amount which is at best a compromise with the desired complete freedom from alkali ion and others. The product of the present invention also has a surprisingly low surface area and correspondingly large pores which results in a cracking catalyst, when combined with alumina or magnesia, having a lower initial activity but a very stable activity throughout its entire life.

It is recognized that a stable activity rather than a high initial activity is desirable in a cracking catalyst since this stable activity produces a more uniform product and prevents over-cracking to form excessive amounts of normally gaseous material and coke that are characteristic of high activity catalysts. The large pores also cause the catalyst to be more easily regenerated since they are not readily clogged by carbonaceous deposits resulting from hydrocarbon conversion. Another advantage to catalysts having large pores is that they may be employed with heavier charge stocks since the pores are capable of accommodating larger molecules and, as hereinbefore stated, are more readily accessible to the beneficial action of regeneration gases.

The method of the present invention is superior to the method using hydrochloric acid as a precipitating agent since the present method uses substantially lower quantities of HF than are required of HCl as will be indicated in the following example. Furthermore, the use of HF greatly increases the speed at which the precipitation may be effected and surprisingly results in a material having substantially different physical characteristics. Although less than the stoichiometric quantity of HCl is required to precipitate the silica, the amount needed is substantially greater than the amount of HF required and therefore a process employing HCl is more costly since greater quantities of reagents are required.

The process of the present invention may be used to form pure silica which may be used for any of the uses to which silica is put such as a catalyst base, a desiccant, an adsorbent for decolorizing solutions or removing readily adsorbable material therefrom, a refractory, etc. Since the silica of the present invention is extremely pure it is more beneficially used as a catalyst and/or catalyst base. Although pure silica in itself has very little catalytic activity, it produces fine catalyst when commingled with other materials which are catalytic in themselves when supported on silica or which show catalytic activity when in the presence of silica, at which time silica itself acts as a catalyst however only in conjunction with the other material.

For example, silica-alumina composites are the most widely used cracking catalysts and show great activity as well as stability and selectivity. Silica-alumina composites may be prepared by the method of the present invention by precipitating silica from an ethylorthosilicate solution and impregnating the resultant material with an aluminum salt such as aluminum sulfate and subsequently treating the impregnated silica with a basic precipitating medium such as ammonia hydroxide whereupon aluminum hydroxide precipitates upon the silica. The aluminum hydroxide may be converted to the hydrated oxide form by drying and calcining the composite whereupon a silica-alumina composite is formed. Another method of forming a silica-alumina composite from the impregnated silica is to simply dry and calcine the impregnated material thereby driving off the sulfate and forming silica-alumina. The former method is preferred since a more favorable distribution of alumina upon silica is achieved.

It is another embodiment of this invention to form a silica-alumina composite directly by mixing alumina sol with ethylorthosilicate and subsequently treating the resultant mixture with HF whereby a hydrogel of silica-alumina is formed which may subsequently be dried and calcined to produce silica-alumina. The alumina sol may be formed by any of the well known methods including the acidification of aluminum metal or aluminum amalgam.

Silica-magnesia composites have long been known to be superior cracking catalysts to any others with reference to favorable distribution of products, however, the poor ability of these catalysts to be regenerated has prevented their wide scale use. One embodiment of the present invention is to produce a readily regeneratable silica-magnesia catalyst composite by treating a solution of ethylorthosilicate with HF to form a hydrosol, adding magnesium oxide powder to the hydrosol and allowing the mixture to set, drying and calcining the hydrogel to produce a silica-magnesia composite. The silica-magnesia thus produced has desirable physical characteristics for a cracking catalyst consisting of large pores, absence of alkali ion and other impurities, low surface area, etc. Silica may also be composited with other materials including zirconia, titania, hafnia, thoria, boria, etc. all of which materials may be classed as irreducible metal oxides.

The silica of the present invention may also be used as a base for other catalytic material such as metals of groups IV, V, VI, VII or VIII, or mixtures of these or their compounds such as their oxides or sulfides. The silica of the present invention may be composited with alumina or magnesia prior to being impregnated with the metals above to form special catalytic composites. For example, a hydrogenating or dehydrogenating catalyst may be prepared by forming pure silica from a mixture of ethylorthosilicate and HF which is gelled, dried and calcined and subsequently saturated with a soluble salt of a metal with good hydrogenating activity such as platinum, palladium, nickel, cobalt, molybdenum, vanadium, etc. The impregnated silica may then be treated with a suitable precipitating reagent such as ammonia, amines or other basic materials and the resultant composite of the metal hydroxide and silica may be dried and calcined to form a composite of the metal oxide and silica which may subsequently be reduced with heat and hydrogen to form a catalyst comprising finely divided metal on pure silica which has high surface area and high activity.

It is not known whether the catalytic metal, when in actual use, is in the form of the pure metal or some compound thereof such as an oxide or sulfide form. It is thought that at the reducing conditions of the reaction zone the pure metal form exists and therefore, in this specification and the following claims, the term metal is used as a generic term covering the pure metal or whatever form exists in the reaction zone. In other words, the term metal is not intended to exclude various oxide, sulfide or other forms of the catalytic material. A typical and extremely effective hydrogenating catalyst may be formed by compositing from about 1% to about 30% of nickel metal on silica produced by the present process.

Since extremely small quantities of metals may be used in such a catalytic composite, it is preferred that there are no impurities present since correspondingly small amounts of impurities may destroy the high activity which is due to the extremely large amount of surface displayed per unit weight of metal. The silica produced by the process of this invention is therefore ideally suited for use as a catalyst carrier since it contains substantially no impurities.

For many conversion processes, particularly for conversion processes of hydrocarbon compounds, it is desirable to employ a catalyst which has activity both with respect to cracking and with respect to hydrogenation. Such processes, of which reforming processes, hydrocracking processes, treating processes for the removal of small quantities of impurities such as combined sulfur and combined nitrogen, etc. are typical, may employ a silica-alumina or silica-magnesia base prepared as hereinbefore described, in conjunction with a suitable hydrogenating component. A catalyst for reforming a straight run gasoline for example, may contain silica-alumina or silica-magnesia composited with small quantities of a metal such as platinum, palladium, nickel, cobalt, iron, molybdenum, vanadium, manganese, chromium, etc. or combinations of these and such a catalyst will beneficially reform the straight run gasoline to produce an uncontaminated saturated higher octane material. The reforming is accomplished through a series of desirable reactions including isomerization of straight chain molecules to produce more highly branched chain molecules, aromatization or naphthenic hydrocarbons to produce aromatic hydrocarbons, dehydrocyclization of straight chain or slightly branched chain hydrocarbons to produce aromatic hydrocarbons, selective cracking of the heavier molecules of the charge stock to produce lighter molecules, etc. The combination of reactions will produce a gasoline fraction boiling in substantially the same range as the charge stock but which is substantially free of the impurities such as nitrogen and sulfur and having an octane number of from about 20 to about 60 points higher than the original charge stock. A particularly suitable catalyst for this process is a catalyst comprising silica-alumina and platinum in an amount of from about 0.01% to about 10% which may or may not contain residual halogen remaining from the HF treatment of the ethylorthosilicate. The residual halogen is beneficial when a high degree of hydrocracking is desired. The reforming reactions are effected at a temperature of from about 600° F. to about 1000° F. in the presence of hydrogen, preferably with the hereinbefore described platinum-containing catalyst.

Catalysts similar to the reforming catalyst hereinabove described are suitable for effecting hydrocracking reactions. Hydrocracking catalysts usually contain greater quantities of hydrogenating promoter than reforming catalysts, a typical example being a catalyst of silica-alumina or silica-magnesia composited with from about 1% to about 30% nickel. This catalyst exhibits extremely good hydrocracking qualities when contacted with a clean gas oil fraction at temperatures as low as 400° F. in the presence of hydrogen, preferably at high pressure. The product from a low temperature hydrocracking process is rich in saturated, branched chain and naphthenic hydrocarbons that boil in the gasoline range.

Catalyst for treating petroleum fractions to remove impurities therefrom such as the desulfurizing of a hydrocarbon fraction, require sufficient cracking activity to produce the cleavage of a carbon-sulfur bond as well as the ability to hydrogenate the resulting hydrocarbon molecule and sulfur atom to form a saturated hydrocarbon and hydrogen sulfide. Such a catalyst may be formed from a base such as silica-alumina prepared by the above described method in conjunction with a sulfur resistant hydrogenating component. Sulfur resistance hydrogenating components generally comprise metals whose sulfides are substantially as good hydrogenating catalysts as the metals themselves or composites of metals whose sulfides show synergistic effects. One particularly suitable desulfurizing catalyst is a composite of silica-alumina or silica-magnesia as prepared by the above described process in conjunction with a mixture of cobalt and molybdenum composited thereon. This composite, at hydrogenating conditions and in the presence of a sulfur-containing charge, forms the sulfide of the metals which display synergistic effects with regard to hydrogenating activity. The silica-alumina or silica-magnesia base acts as an acid-acting catalyst and facilitates the severance of carbon-sulfur or carbon-nitrogen bonds thereby increasing the effectiveness of the catalyst. A particularly suitable desulfurizing process may be effected by contacting the sulfur-containing material at a temperature of from about 400° F. to about 750° F. with a catalyst comprising silica-alumina prepared by the process of this invention composited with cobalt and molybdenum in the presence of hydrogen.

In the case of reforming and treating catalyst, it is extremely desirable that the catalyst's cracking activity is maintained at a reasonably low level in order to prevent an excessive amount of destructive reactions from occurring. The process of the present invention produces low cracking activity catalyst by limiting the surface available for promoting reaction. The activity may also be limited by regulating the amount of alumina or magnesia contained in the composite. Therefore, when a silica-alumina composite is produced containing say 15% alumina it will have a rather high cracking activity and is suitable for such reactions as cracking, hydrocracking, polymerization, etc., however, when it is desired to reform, with limited cracking, substantially less alumina, in the range of from about 1% to about 7%, may be used.

Following are several examples which further illustrate the novelty and utility of the present invention but which are not intended to unduly limit the invention to the particular materials and concentrations described.

*Example I*

Example I illustrates the process of the present invention. 50 ml. of ethylorthosilicate solution containing 0.225 mol of ethylorthosilicate were commingled with 10 grams of 4.8% HF in 200 cc. of water. The ratio of mols of acid used to mols of acid stoichiometrically required to neutralize the solution is 0.027. The silica hydrosol set to a firm hydrogel in 45 minutes, after which it was dried at 300° F. for a period of 3 hours and calcined at a temperature of 1100° F. for 3 hours. The final product had a surface area of 467 square meters per gram, an average pore diameter of 91 A. and an average pore volume of 1.058 cubic centimeters per gram.

*Example II*

Example II illustrates the process of the present invention using a less concentrated HF solution than that used in Example I. 50 ml. of ethylorthosilicate solution containing 0.225 mol of ethylorthosilicate were commingled with 10 grams of 4.8% HF in 400 cc. of water which is a concentration ½ as great as in the previous example, however, with the same number of mols of HF present. The ratio of mols of acid used to mols of acid required was again 0.027, however, the increased amount of water contained in the hydrogel caused the setting time to be increased from 45 minutes to 4 hours. The hydrogel was dried and calcined in a manner identical to that of the previous example and the resultant silica gel had the following characteristics: surface area 358 square meters per gram, pore diameter 124 A., pore volume 1.109 cubic centimeters per gram.

*Example III*

Example III illustrates the process of the present invention using a lesser quantity of HF for precipitating the silica hydrogel. In this case 50 ml. of the said ethylorthosilicate solution is mixed with 5 grams of 4.8% HF in 200 ml. of water which amounts to an acid used to acid required ratio of 0.0135. The hydrogel sets in 1 hour and 45 minutes and upon being dried and calcined is found to have a surface area of 397 square meters per gram, a pore diameter of 113 A. and a pore volume of 1.072 cubic centimeters per gram. It may be seen from Examples I, II and III that by suitably adjusting the amounts and concentrations of the precipitating solution, the physical characteristics of the final silica gel composite may be regulated as well as the gelation time.

*Example IV*

Example IV illustrates the process of precipitating silica hydrogel from ethylorthosilicate by using HCl instead of HF. 50 ml. of ethylorthosilicate solution containing 0.225 mol of ethylorthosilicate were commingled with 25 cc. of HCl contained in 200 cc. of water. The amount of acid used as compared with the amount required was 0.33. It took 18 hours for the hydrogel to set and the final dried and calcined composite had a surface area of 780 square meters per gram, a pore diameter of 23 A., and a pore volume of 0.457 cc. per gram. It may be seen that the setting time required for such a hydrogel is extremely long compared to that required for the HF precipitation. Furthermore, significantly greater quantities of acid are required, more than 10 times as much, in order to effect the precipitation in the substantially longer period of time. A more important difference between the HCl precipitation and the process of the present invention is that the final product has extremely high surface area which results in too great an initial activity and has extremely small pores which result in difficult regeneration as well as the other difficulties characteristic of small pore composites. The preparation of silica hydrogel with HCl is through a different series of reactions as evidenced by the fact that a by-product of the HCl precipitation is ethyl chloride while the by-product of the HF preparation is ethyl alcohol. The significance of this, of course, is that the HCl is consumed in precipitating silica gel while the HF is not. In all of Examples I through IV the final product was pure silica gel and contained no alkali metal ions.

*Example V*

2 mols of ethylorthosilicate were mixed with 1250 cc. of water and the resultant solution was commingled with 10 grams of 4.8% HF. The resultant mixture which contained a ratio of acid used to acid required of 0.032, was mixed with a slurry of magnesium oxide powder in water and allowed to set into a hydrogel. The resultant hydrogel was dried and calcined in the manner of the hydrogels of the prior examples and the resulting composite had the following physical characteristics: surface area 328 square meters per gram and pore diameter 53 A. This silica-magnesia catalyst is an improvement over conventionally prepared catalyst containing silica and magnesia in that it has substantially greater average pore diameter and a lesser surface area. Since it is a characteristic of silica-magnesia catalyst to be not readily regeneratable due to extremely small pores, the catalyst prepared by the method of this example represents a silica-magnesia catalyst which may be successfully employed for cracking reactions.

*Example VI*

50 ml. of ethylorthosilicate solution containing 0.275 mol of ethylorthosilicate are commingled with alumina sol and the resultant mixture is commingled with 10 grams of 4.8% HF. The resultant hydrogel is dried and calcined in the manner of the previous examples and results in a silica-alumina composite which has a surface area of 428 square meters per gram, a pore diameter of 105 A. and a pore volume of 1.072. The silica-alumina composite is completely free of alkali metal ions and exhibits high activity when used to catalyze cracking reactions.

*Example VII*

The silica-alumina composite of Example VI is impregnated with a solution of chloroplatinic acid and the resultant impregnated material is dried, calcined and placed in an atmosphere of hydrogen at a temperature of 200° F. The resultant silica-alumina-platinum composite is contacted with a straight run gasoline fraction, in the presence of hydrogen, at a temperature of 900° F. to produce a reformed gasoline having a substantially higher octane number than the charge stock and which is stable, saturated and substantially free of impurities.

Although the process of the present invention has been described with relation to silica, silica-alumina, and silica-magnesia it may also be employed with other siliceous composites such as silica-zirconia, silica-titania, silica-boria, silica-thoria, etc. The composite of the present invention may be formed in trays as layers of gel to be subsequently ground or powdered or may be formed into spheres ranging in diameters from what is commonly known as microspheres to those ¼ inch in diameter or more by the conventional sphere forming methods. As in the case of other hydrosols, the hydrosols produced by the present invention may be caused to set in a lesser period of time by increasing the temperature at which setting is effected or the setting may be retarded by decreasing the temperature at which the gel is formed.

The silica-metal oxide composites formed by the present invention are hard, attrition resisting solids which may be used in fluidized or moving bed cracking processes and are preferably employed to crack petroleum fractions at temperatures of from about 700° F. to about 1100° F. The catalysts of the present invention are heat and steam resistant and may be regenerated by burning at temperatures in excess of 1000° F. and ranging up to 1500° F. or more.

Since the solubility of a ethylorthosilicate in water is limited, it is not definitely known what state various mixtures will be in and the term solution is therefore used to include true solutions as well as mixtures of solutions and suspensions, as when the limits of solubility are exceeded. Equivalent results are obtained whether a solution or mixed solution and suspension are used.

We claim as our invention:

1. The method of preparing silica hydrogel which comprises commingling with an aqueous ethylorthosilicate solution from about 0.001 to about 0.1 mol of hydrogen fluoride per mol of ethylorthosilicate and gelling the resultant hydrosol.

2. The method of preparing a solid low surface area siliceous material which comprises adding to an ethylorthosilicate solution from about 0.1 mol of HF per mol of ethylorthosilicate to about 0.001 mol of HF per mol of ethylorthosilicate, allowing the resultant hydrosol to set into a hydrogel, drying the resultant hydrogel at a temperature of from about 100° F. to about 600° F. and calcining at a temperature of from about 600° F. to about 1500° F.

References Cited in the file of this patent

UNITED STATES PATENTS

| | | |
|---|---|---|
| 1,450,467 | Weyland | Apr. 13, 1923 |
| 1,539,342 | Williams | May 26, 1925 |
| 1,858,100 | McAdoo | May 10, 1932 |
| 2,027,931 | Roy | Jan. 14, 1936 |
| 2,027,932 | Roy | Jan. 14, 1936 |
| 2,154,079 | Weiss | Apr. 11, 1939 |
| 2,267,767 | Thomas | Dec. 30, 1941 |
| 2,317,803 | Reeves | Apr. 27, 1943 |
| 2,437,532 | Huffman | Mar. 9, 1948 |
| 2,500,146 | Fleck et al. | Mar. 14, 1950 |
| 2,550,531 | Ciapetta | Apr. 24, 1951 |